United States Patent [19]

Thomas

[11] Patent Number: 4,554,756
[45] Date of Patent: Nov. 26, 1985

[54] FISHING HOOK SYSTEM HAVING A SEALED BAIT CONTAINER, AND METHOD OF MAKING SAME

[76] Inventor: Mit Thomas, P.O. Box 558, Malakoff, Tex. 75148

[21] Appl. No.: 548,649

[22] Filed: Nov. 4, 1983

[51] Int. Cl.⁴ .............................................. A01K 97/02
[52] U.S. Cl. ................................. 43/44.99; 43/42.06; 43/41; 43/44.2; 43/42.38
[58] Field of Search .................... 43/44.99, 44.6, 44.8, 43/42.06, 42.29, 41, 42.37, 42.38, 44.2, 44.4

[56] References Cited

U.S. PATENT DOCUMENTS

| | | | |
|---|---|---|---|
| 1,673,978 | 6/1928 | Guindon | 43/41 |
| 2,588,526 | 3/1952 | Hoage | 43/44.6 |
| 2,736,123 | 2/1956 | Peterson | 43/42.38 |
| 2,869,279 | 1/1959 | Pretorius | 43/42.06 |
| 2,910,800 | 11/1959 | Cicala | 43/42.37 |
| 3,066,434 | 12/1962 | Duller | 43/42.06 |
| 3,163,958 | 1/1965 | Quinn | 43/44.8 |
| 3,200,532 | 8/1965 | Walton | 43/44.6 |
| 3,879,886 | 4/1975 | Thomas | 43/44.6 |
| 3,969,840 | 7/1976 | Charron | 43/42.06 |
| 4,221,069 | 9/1980 | Esses | 43/41 |
| 4,257,182 | 3/1981 | Thom | 43/42.35 |

FOREIGN PATENT DOCUMENTS

| | | | |
|---|---|---|---|
| 787080 | 6/1968 | Canada | 43/44.6 |
| 787327 | 12/1957 | United Kingdom | 43/44.6 |

Primary Examiner—Kuang Y. Lin
Assistant Examiner—K. Rowan
Attorney, Agent, or Firm—T. D. Copeland

[57] ABSTRACT

A special fishing hook and bait system, wherein one or more barbed hooks are incorporated on a shank, and wherein the preferred embodiment employs on the shank spaced from the hook barb a removably mounted prepared fish food package forming the bait, that is made in the form of a tube having therein separate bait compartments which are used sequentially as needed by a fisherman, by puncturing the package end nearest the hook barb.

3 Claims, 15 Drawing Figures

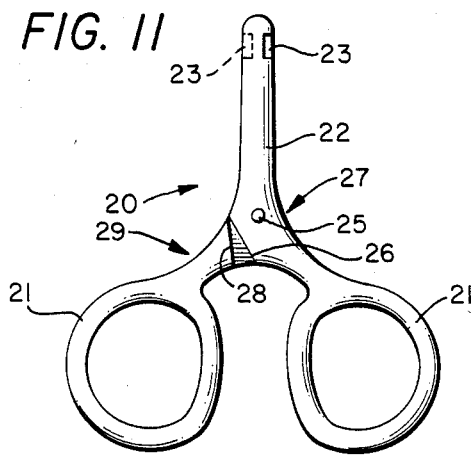
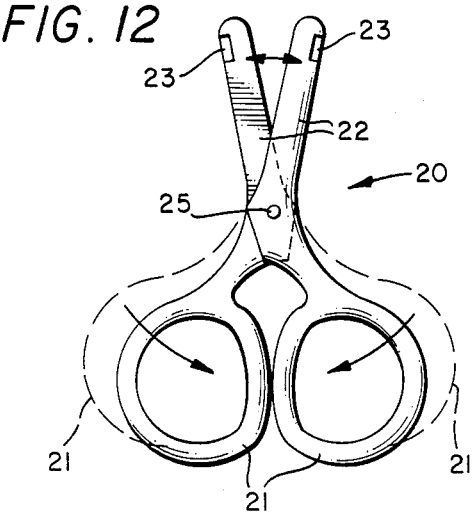
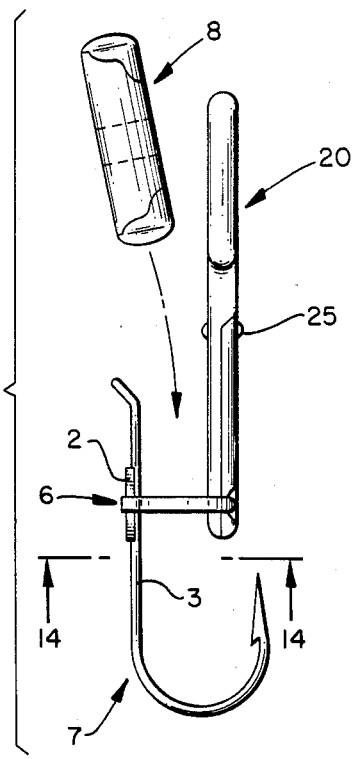
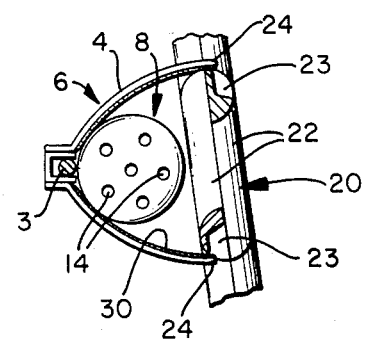
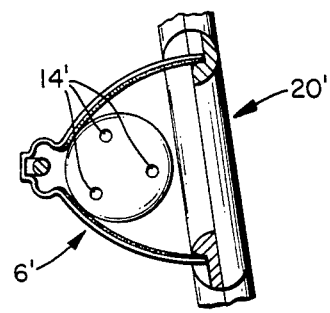

FISHING HOOK SYSTEM HAVING A SEALED BAIT CONTAINER, AND METHOD OF MAKING SAME

BACKGROUND OF THE INVENTION

1. Field of Use

This invention relates generally to fish hooks and more particularly to fish hooks adapted to contain prepared and packaged natural or synthetic food bait, as contrasted to the use of live bait (minnows, worms, etc.), or the use of artificial bait (lures, plastic worms, spinners, and the like).

2. Statement of the Prior Art

The prior art discloses many types of fish hooks, but there are predominately intended to receive or be associated with live bait or with artificial lures. My own U.S. Pat. No. 3,879,886, is an example of a prior hook that permits prolonged use of live bait. Other patents that use holders for live or artificial bait include U.S. Pat. Nos. 2,736,123, to Peterson, 3,299,561, to Desbois, 3,415,004, to Whalen, 2,932,116, to Woodzick, and 2,896,360, to Lucas, who uses colored beads and colored yarn as bait material, in addition to his use of live bait.

However, none of the prior art patents of which I am aware, use a prepared and packaged food bait, in the manner and with the construction herein disclosed.

SUMMARY OF THE INVENTION

A principal object of this invention is to provide a simple economical, easy to use fish hook that utilizes a prepared and packaged food bait.

Another object is to provide a packaged food bait that is not consumed when a fish is caught, since it does not reside on the barb itself.

An additional object is to provide an arrangement in a fish hook where the same bait will last thru many uses, and may then be switched in position to start the use cycle all over again.

A further object is to provide a packaged bait which remains in its package during use, and yet which utilizes the aroma of the bait to attract fish over long periods of time.

And another object is to provide a multi-compartment packeaged food bait which includes a rigid separator between the compartments, that also provids a holding area for the clamp that attaches the bait to the hook.

The adavantages of using this type of bait in this type of container in this type of holder on a fish hook are many. Extreme convenience in handling is one, ease and security of installation is another, and indefinite storage time as compared to live bait is a third. Other advantages will become apparent during usage.

BRIEF DESCRIPTION OF THE DRAWING

FIG. 11 is a front elevational view of the special clip expanding tool of this invention in its closed position;

FIG. 12 is the same view as FIG. 11 showing the tool in its expanded or open position;

FIG. 13 is a composite side elevational view illustrating the method of assembly of the bait container into its position in the hook system thru the use of the clip expanding tool of FIGS. 11 & 12;

FIG. 14 is a cross sectional view taken along the lines 14—14 of FIG. 13.

FIG. 15 is a similar view to FIGS. 14, showing a modified embodiment of this invention.

DESCRIPTION OF PREFERRED EMBODIMENT

Figure 1:
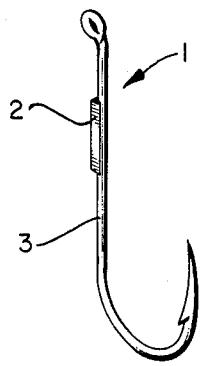
FIG. 1 is a side elevational view of a fish hook which has been prepared to receive a special bait clip of this invention.

The hook structure 1 shown in FIG. 1 is conventional, except for the small lug 2 which is brazed or otherwise attached to the backside of the single barb hook 3 for a purpose hereinafter explained.

Figure 2:
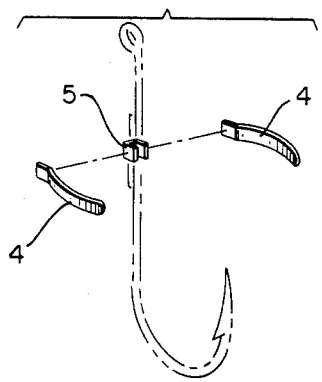
FIG. 2 is a prespective exploded view of the bait clip to be attached to the hook of FIG. 1.
Figure 3:
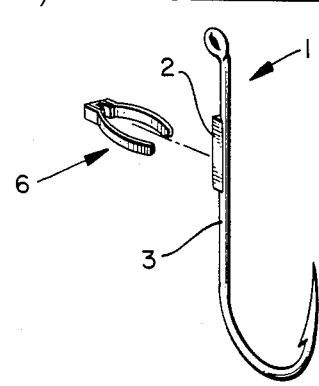
FIG. 3 is a perspective exploded view of the clip of FIG. 2 (now assembled), showing it being attached to the shank of of the hook of FIG. 1.

FIG. 2 shows the hook structure 1 of FIG. 1 in a phantom outline, and shows the two arms 4 and U-shaped hub 5 in a spaced arrangement for illustrative purposes prior to their engagement and assembly together by brazing or similar means to form the generally U-shaped clip 6 of FIG. 3.

Figure 4:
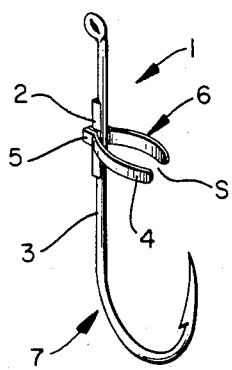
FIG. 4 is a perspective elevational view of the assembled hook and clip shown in FIGS. 1–3.
Figure 5:
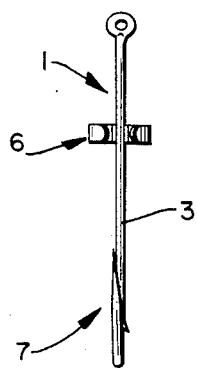
FIG. 5 is a front elevational view of the hook assembly shown in FIG. 4.

FIG. 4 shows the structure assembly 7 of the hook and clip as an integral unit wherein the clip 6 may be brazed or otherwise attached to the lug 2 and to hook 3 as desired. The hook structure assembly 7 of FIGS. 4 & 5 will be combined with the packaged bait container 8 of FIG. 6 as later described, to form the unique fish hook and packaged bait system 15 of FIGS. 7–10.

Figure 6:
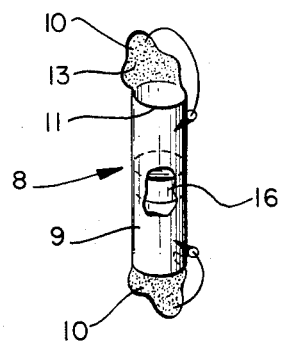
FIG. 6 is a perspective view of the prepared and packaged food bait container (partially cutaway) used in this invention.
Figure 7:
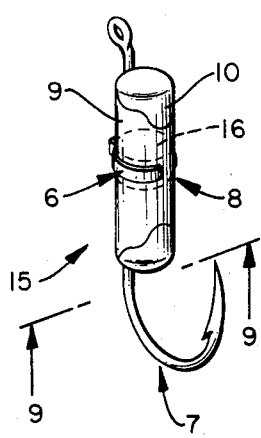
FIG. 7 is a perspective view showing the bait container of FIG. 6 installed on the hook assembly of FIGS. 4 & 5.
Figure 8:
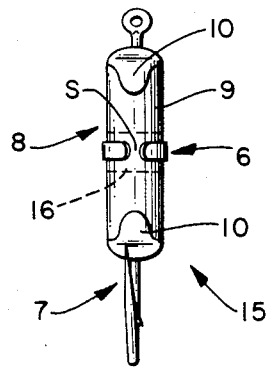
FIG. 8 is a front view of the hook and bait system o f FIG. 7.
Figure 10:
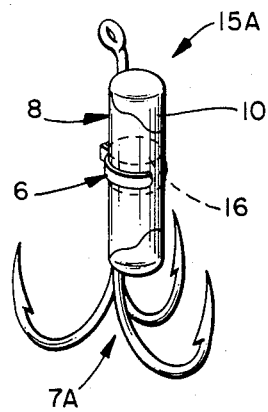
FIG. 10 is a modified embodiment of the system of FIGS. 7 & 8.
Figure 9:
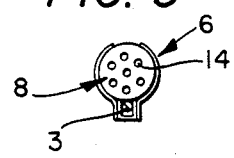
FIG. 9 is a cross sectional view taken along the lines 9—9 of FIG. 7.

The bait package 8 of FIG. 6 is not limited to a particular shape, except that the shape of one intermediate area must be compatible with the shape of the engaging clip 6 for maximum security. The container also is not limited in the specific material employed for its sidewalls and cover flaps 10, except that it must be non-porous and be easily punctured, and a thin flexible plastic is one suitable material. The clip 6 is made of a semi-rigid, yet flexible material, such as spring steel or plastic, and the hook and barb are conventional and generally metal.

The bait used may be one of several synthetic or fish food baits, and any of a type of moist granular artifical and aromatic baits that are currently on the market would serve this purpose. This belt is manually or automatically loaded into an empty container shell 9, and when filled, the flap 10 is pressed against the sidewall 11 adjoining the open end 12 of the shell. Since the flap 10 includes an adhesive coated inner edge 13, it will adhere to the shell once it is closed and pressed into place. This section seals in the bait and its aroma, until the fisherman punctures one end 10 several times with an ice pick or other sharp instrument. These openings 14 will release the aroma and permit some of the bait fluid to escape into the adjoining water to thereby attract the fish.

The internal plug 16, which may be wood, separates the bait container into two bait compartments, and also provides a rigid support for the clip 6 when the bait package 8 is installed on the hook structure assembly 7 to form the hook and bait package system 15. Either before or after the time of installation, the container end nearest the hook barb is punctured, as at 14. When this compartment nearest the barb is depleted of bait, the package 8 is removed from the clip 16, and rotated 180°, and the other end flap 10 is punctured, when reinstalling in clip 6.

FIGS. 11 & 12 show the details of the special clip expanding tool 20 which causes the relatively stiff spring steel clip 6 to be expanded so that the bait package 8 may be easily inserted therein. Tool 20 bears the appearance of a small pair of scissors, but in this tool, squeezing the finger rings 21 together causes the shank portions 22 to separate contra to a scissor action. Each shank 22 also includes a small notched out area 23 to assist in gripping the free ends 24 of clip 6, as seen in FIGS. 13 & 14. As finger rings 21 are squeezed together, the shanks 22 rotate about their pivot 25, causing notches 23 to further separate until the edge 26 of one finger ring shank section 27 engages stop 28 of the other finger ring 29. This position is also the position at which finger rings 21 are engaged, and the position at which the notches 23 are at their greatest separation distance, which is, by its nature, the position whereat the arms 4 of clip 6 are at their maximum expanded position. Then at this position, the bait package 8 may be slipped into the open area inside the clip 6 for its positioning within the hook structure 7 to thus form the fish hook and packaged bait system 15 of this invention.

For the purpose of making the engagement of the clip 6 even more secure about the bait package 8, the inner side of arms 4 may be coated with a gritty paint, such as a sand and varnish mixture 30 that prevents slippage when the finger pressure in rings 21 of tool 20 is released and the shanks 22 are allowed to come together under the pressure of the spring steel arms 4. When this occurs, the free ends 24 of arms 4 will gradually slide from engagement with tool 20. Removal of the bait package 8 for 180° reversal when one bait compartment is exhausted, or for replacement when both compartments are exhausted, may be accomplished even simpler, by simply pulling the bait package 8 thru the open space S remaining after the bait package 8 is installed. Or the tool 20 may be used again in the reverse sequence to the loading cycle.

FIG. 15 shows a modified embodiment of the clip, identified as 6', and a modified embodiment of the tool 20', that provide a slightly different assembly and disassembly technique, and permit the use of a clip 6' that grasps the hook shank 3 with or without the requirement of being brazed to it. Also the end 10 of bait package 8 may be selectively perforated by three holes only for use with the three barb hook structure 7A of FIG. 10. In the use of tool 20', the shanks 22' are mainly outside of the clip 6' when in use, instead of inside as shown in FIG. 14. The end piece 5' of clip 6' is configured to fit tightly around shank 3 when clip 6' is closed to fully grasp bait package 8. The notches 23' of tool 20' are so shaped as to prevent slippage of the ends 24 when opening clip 6', and yet permit an easy slide off action when the shanks 22' of tool 20' are completely closed.

What is claimed:

1. A combination fish hook and packaged bait system, comprising:
   a. a hook structure assembly having a barb and shank and including
   b. a stiff spring action clip installed on said shank, and
   c. a packaged bait container installed in said clip, and
   d. an easily punctured section at a selected end of said container, wherein,
   e. said clip is adapted to firmly grip and hold said bait container on the side of said shank adjacent to and in the vicinity of, but separate from and not engaging said barb, wherein
   f. said container is divided into compartments separated by a rigid block, and
   g. wherein said container is tubular in shape and said block is rigid and circular and is snugly fitted into said container, and wherein said block reinforces said package when installed in said clip.

2. A packaged bait container as in claim 1 wherein said tubular container is initially filled with fish food in each compartment, and wherein one compartment is initially pierced, and upon exhaustion of the fish food therein, said second compartment is pierced at the time it is rotated 180° to be near said barb.

3. A combination fish hook and packaged bait system, comprising:
   a. a hook structure assembly having a barb and shank and including
   b. holding means installed on said shank, and
   c. a packaged bait container installed in said holding means, and
   d. an easily punctured section at a selected end of said container, wherein,
   e. said holding means is adapted to firmly grip and hold said bait container on the side of said shank adjacent to and in the vicinity of, but separate from and not engaging said barb,
   f. a block in said container, wherein said container is divided into compartments separed by said block, and
   g. wherein said container is tubular in shape and said block is rigid and circular and is snugly fitted into said container, and wherein said block reinforces said package when installed in said holding means.

* * * * *